United States Patent
Bish et al.

(10) Patent No.: US 11,274,189 B2
(45) Date of Patent: *Mar. 15, 2022

(54) CURING AGENTS FOR COMPOUNDS

(71) Applicant: DuPont Polymers, Inc., Wilmington, DE (US)

(72) Inventors: Christopher J Bish, Kennett Square, PA (US); Peter A Morken, Wilmington, DE (US); Amiya Ratan Tripathy, Garnet Valley, PA (US)

(73) Assignee: DuPont Polymers, Inc., Wilmington, DE (US)

( * ) Notice: Subject to any disclaimer, the term of this patent is extended or adjusted under 35 U.S.C. 154(b) by 42 days.

This patent is subject to a terminal disclaimer.

(21) Appl. No.: 16/583,802

(22) Filed: Sep. 26, 2019

(65) Prior Publication Data

US 2020/0024425 A1 Jan. 23, 2020

Related U.S. Application Data

(63) Continuation of application No. 14/866,890, filed on Sep. 26, 2015, now Pat. No. 10,472,494.

(51) Int. Cl.
  *C08K 5/31* (2006.01)
  *C08K 3/04* (2006.01)
  *C08K 5/405* (2006.01)

(52) U.S. Cl.
  CPC .................. *C08K 5/31* (2013.01); *C08K 3/04* (2013.01); *C08K 5/405* (2013.01)

(58) Field of Classification Search
  CPC ............. C08K 5/31; C08K 3/04; C08K 5/405
  See application file for complete search history.

(56) References Cited

U.S. PATENT DOCUMENTS

| | | | |
|---|---|---|---|
| 5,554,680 A | 9/1996 | Ojakaar | |
| 5,565,512 A | 10/1996 | Saito et al. | |
| 5,789,489 A | 8/1998 | Coughlin et al. | |
| 6,281,296 B1 | 8/2001 | Maclachlan et al. | |
| 6,638,999 B2 * | 10/2003 | Bish .................... | C08F 214/262 524/195 |
| 7,470,762 B2 * | 12/2008 | Percec ...................... | C08F 2/38 526/317.1 |
| 7,999,049 B2 | 8/2011 | Coughlin et al. | |
| 2002/0026014 A1 | 2/2002 | Bish et al. | |
| 2004/0214956 A1 * | 10/2004 | Aufdermarsh ........... | C08K 5/16 525/326.2 |
| 2005/0143529 A1 | 6/2005 | Grootaert | |
| 2010/0216933 A1 | 8/2010 | Wang | |
| 2014/0051791 A1 | 2/2014 | Horie et al. | |
| 2014/0155532 A1 | 6/2014 | Wang | |
| 2014/0171609 A1 | 6/2014 | Obeso et al. | |

FOREIGN PATENT DOCUMENTS

| | | |
|---|---|---|
| JP | 2004-500459 A | 1/2004 |
| JP | 2012-519221 A | 8/2012 |
| JP | 2016-502584 A | 1/2016 |
| WO | 2001/059005 A2 | 8/2001 |
| WO | 2004/069900 A2 | 8/2004 |

OTHER PUBLICATIONS

European Extended Search Report for Application No. 16190149.1, EPO, dated Jan. 18, 2018.
European Search Report in EP application No. 16190149.1 dated Feb. 3, 2017.

* cited by examiner

Primary Examiner — Jessica M Roswell
(74) Attorney, Agent, or Firm — Matthew T. Fewkes

(57) ABSTRACT

Curing fluoroelastomers using curing agents of formula, $R_1N=CR_2R_3$, wherein $R_1$ is H; $R_2$ is selected from the group consisting of H, $NH_2$, and $NR_4R_5$; $R_3$ is selected from the group consisting of Ph, $SO_2H$, $NR_6R_7$, 2-pyridine, and $CH_2CONH_2$; $R_4$ is H; $R_5$ is selected from the group consisting of Ph, $NH_2$, and CN; $R_6$ is selected from the group consisting of H, NHPh, $CCONH_2$, $C_1$ to $C_8$ linear alkyl group, and $C_1$ to $C_8$ branched alkyl group; and $R_7$ is selected from the group consisting of Ph, $COOC(CH_3)_3$, $NH_2$, $CH_2COOH$, $CSNH_2$, $CNHNH_3^+Cl^-$, p-phenylCN, COPh,

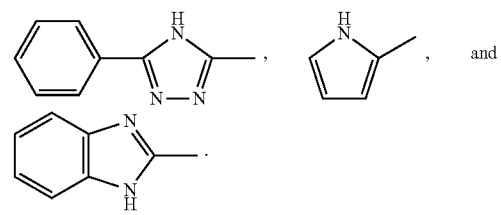

14 Claims, No Drawings

CURING AGENTS FOR COMPOUNDS

CROSS-REFERENCE TO RELATED APPLICATION

The present application claims priority under 35 U.S.C. § 120 as a continuation of U.S. patent application Ser. No. 14/866,890, filed on Sep. 26, 2015, which is incorporated herein by reference in its entirety.

OVERVIEW

Described herein are curing agents for use in compounds (also called curable compositions) and expressly including compounds comprising a perfluoroelastomer, and articles cured from these compounds.

Elastomer compounds that comprise a fluoroelastomer have achieved outstanding commercial success because they can be used in severe environments, in particular, during exposure to high temperatures and to aggressive chemicals. For example, these compounds are used in seals in hot or otherwise sections of aircraft engines, in oil-well drilling devices, and as sealing elements in industrial equipment that operate at high temperatures.

The properties of cured elastomer compounds arise largely because of the stability and inertness of the copolymerized monomers that make up the major portion of the polymeric backbone of these compounds. Such monomers include tetrafluoroethylene and perfluoro(alkyl vinyl) ethers. In order to develop elastomeric properties fully, elastomer compounds are typically crosslinked, i.e., vulcanized or cured. To this end, a small percentage of cure site monomer is copolymerized with the monomers (whether fluorinated or perfluorinated). Upon crosslinking, the cure site monomer reacts with a curing agent to form a crosslinked elastomer entity in the form of an article.

Cure site monomers containing at least one nitrile group, for example perfluoro-8-cyano-5-methyl-3,6-dioxa-1-octene, may be used and compositions comprising such cure site monomers are described in U.S. Pat. No. 7,999,049, col. 10 through col 16, which is hereby incorporated herein by reference in its entirety.

U.S. Pat. No. 5,565,512 discloses ammonium salts of organic or inorganic acids as curing agents for compounds. Such curing agents may not be completely soluble in the compound.

U.S. Pat. No. 6,281,296, discloses components that are capable of generating ammonia as a curing agent for nitrile-containing fluoroelastomers. Some of these ammonia-generating components may also not be completely soluble when mixed with the nitrile-containing fluoroelastomer.

Described herein are curing agents for these compounds, which curing agents do not comprise elements that produce ammonia during curing. Also described herein are articles comprising the compounds described herein as well as methods making the articles.

DETAILED DESCRIPTION OF THE INVENTION

Abbreviations

The claims and description herein are to be interpreted using the abbreviations and definitions set forth below.
"h", "hrs" refers to hours.
"%" refers to the term percent.
"mole %" refers to mole percent.
"wt %" refers to weight percent.
"parts" refers to parts by weight.
"phr" refers to parts per hundred parts of fluoroelastomer (rubber); one of skill in the art uses and recognizes this term of measurement. For example, 3 parts of a component per 100 parts fluoroelastomer is written as 3 phr. In these compounds, processes, and articles described herein, phr is based on 100 parts of fluoroelastomer A.
"g" refers to grams
"Ph" refers to a phenyl ring.

Definitions

As used herein, the article "a" refers to one as well as more than one and does not necessarily limit its referent noun to the grammatical category of singular number.

As used herein, the terms "about" and "at or about", when used to modify an amount or value, refers to an approximation of an amount or value that is more or less than the precise amount or value recited in the claims or described herein. The precise value of the approximation is determined by what one of skill in the art would recognize as an appropriate approximation to the precise value. As used herein, the term conveys that similar values, not precisely recited in the claims or described herein, can bring about results or effects that are equivalent to those recited in the claims or described herein, for which one of skill in the art would acknowledge as acceptably brought about by the similar values.

As used herein, the term "article" refers to an unfinished or finished item, thing, object, or an element or feature of an unfinished or finished item, thing or object. As used herein, when an article is unfinished, the term "article" may refer to any item, thing, object, element, device, etc. that has a form, shape, configuration that may undergo further processing in order to become a finished article. When an article is unfinished, the term "preform" may refer to that form, shape, configuration, any part of which may undergo further processing to become finished. As used herein, when an article is finished, the term "article" refers to an item, thing, object, element, device, etc. that is in a form, shape, configuration that is suitable for a particular use/purpose without further processing of the entire entity or a portion of it.

An article may comprise one or more element(s) or subassembly(ies) that either are partially finished and awaiting further processing or assembly with other elements/subassemblies that together will comprise a finished article. In addition, as used herein, the term "article" may refer to a system or configuration of articles.

As used herein, the terms "comprises," "comprising," "includes," "including," "has," "having" or any other variation of these, refer to a non-exclusive inclusion. For example, a process, method, article, or apparatus that comprises a list of elements is not limited to only the listed elements but may include other elements not expressly listed or inherent. Further, unless expressly stated to the contrary, "or" refers to an inclusive, not an exclusive, or. For example, a condition A or B is satisfied by any one of the following: A is true (or present) and B is false (or not present), A is false (or not present) and B is true (or present), and both A and B are true (or present). As used herein, the terms "comprises," "comprising," "includes," "including," "has," "having", "consisting essentially of", and "consisting of" or any other variation of these, may refer either to a non-exclusive inclusion or to an exclusive inclusion.

When these terms refer to a more exclusive inclusion, these terms limit the scope of a claim to those recited materials or steps that materially affect the novel elements of the recited invention.

When these terms refer to a wholly exclusive inclusion, these terms exclude any element, step or component not expressly recited in the claim.

As used herein, terms that describe molecules or polymers follow the terminology in the IUPAC Compendium of Chemical Terminology version 2.15 (International Union of Pure and Applied Chemistry) of Sep. 7, 2009.

As used herein, the term "unsaturated fluorinated olefin" refers to linear, branched, or cyclic hydrocarbon structures which comprise at least one unsaturated double bond and comprise at least one fluorine atom.

As used herein, the term "alkyl" refers to linear, branched, or cyclic hydrocarbon structures and combinations of there. Alkyl does not include aromatic structures. Examples of linear alkyl groups include methyl, ethyl, propyl, butyl, pentyl, and hexyl groups. Branched alkyl groups include for example s- and t-butyl, and isopropyl groups. Examples of cyclic hydrocarbon groups include cyclopropyl, cyclopentyl, cyclohexyl, cyclobutyl, and cyclooctyl groups. As used herein, the term "unsaturated fluorinated olefin" refers to linear, branched, or cyclic carbon structures which comprise at least one unsaturated double bond and comprise at least one fluorine atom.

As used herein, the term "alkoxy" or "alkoxyl" refers to alkyl groups attached to an oxygen atom by a single bond. The other bond of the oxygen atom is connected to a carbon atom. Examples include methoxy, ethoxy, propoxy, isopropoxy, cyclopropyloxy, and cyclohexyloxy.

As used herein, the term "curing agent C different from curing agent B" refers to a curing agent C that does not have the same chemical structure as curing agent B.

As used herein, the term "compound" refers to a composition that is able to be cured, i.e., a curable composition, as well as to a mixture of chemical entities that comprises at least a fluoroelastomer and a curing agent. The mixture of chemical entities has not been cured nor has undergone processing conditions that would cause the curing of the mixture of chemical entities to undergo curing.

As used herein, the prefix term "fluoro", when placed as a prefix before a chemical entity name, refers to a chemical entity that has at least one fluorine atom as exemplified by the following designations: fluoroelastomers, perfluoroelastomers, fluorovinyl, and perfluorovinyl ethers. The prefix "fluoro", when placed as a prefix before a chemical entity name, expressly includes "perfluoro" chemical entities. Thus, the prefix "fluoro", when preceding a chemical entity name, indicates both "fluoro-" entities and "perfluoro-" entities.

As used herein, the term "cured" refers to that resultant entity that comprised a fluoroelastomer and which has been exposed to those conditions that caused the fluoroelastomer molecules to form sufficient crosslinks among themselves (that is, curing conditions) such that the resultant entity takes on a form or shape or configuration or structure that cannot be reprocessed, molded, or extruded into a different one. That is, once a resultant entity which comprised a fluoroelastomer has been exposed to curing conditions to thereby be cured, that entity cannot be re-cured to take on a substantially different form or shape or configuration or structure.

As used herein, the terms "curing", "cured" refer to that processing of a compound, also called herein curable composition, which results in an entity taking on a form or shape or configuration or structure that cannot be reprocessed, molded, or extruded into a different one. Such processing refers to the "curing process/processing", which requires compounds to be exposed to certain conditions in order to initiate the curing process, such conditions called curing conditions.

The resultant entity of the curing process is a "cured" entity, that is, an article as defined hereinabove. To be clear, curing results in compounds taking on a form or shape or configuration or structure of an article. Cured articles of compounds described herein include, but are not limited to, O-rings, seals, and gaskets.

The terms "curing", "cured" also expressly include differing degrees of processing of a compound such that the resultant entity takes on a form or shape or configuration or structure that cannot be reprocessed, molded, or extruded into a different one and which may exhibit certain physical properties as a result of the curing.

To the point, these compounds may be initially cured to achieve a non-reprocessable form, shape, etc., which has been termed "cured" herein. The cured compounds may be further subjected to additional curing conditions, which provide additional, subsequent curing. Such additional curing conditions may be variously termed herein either as "curing" or as "post-curing". That is, the terms "curing", "cured" refer to both an initial curing process that results in a first cured, resultant entity and also expressly refer to any subsequent curing process that results in a subsequently cured, resultant entity that may or not possess different material or physical properties than those of the first cured, resultant entity.

Ranges and Preferred Variants

Any range set forth herein expressly includes its endpoints unless explicitly stated otherwise. Setting forth an amount, concentration, or other value or parameter as a range specifically discloses all possible ranges formed from any possible upper range limit and any possible lower range limit, regardless of whether such pairs of upper and lower range limits are expressly disclosed herein. Compounds, processes and articles described herein are not limited to specific values disclosed in defining a range in the description.

The disclosure herein of any variation in terms of materials, chemical entities, methods, steps, values, and/or ranges, etc.—whether identified as preferred or not—of the processes, compounds and articles described herein specifically intends to include any possible combination of materials, methods, steps, values, ranges, etc. For the purpose of providing photographic and sufficient support for the claims, any disclosed combination is a preferred variant of the processes, compounds, and articles described herein.

In this description, if there are nomenclature errors or typographical errors regarding the chemical name any chemical species described herein, including curing agents of formula (I), the chemical structure takes precedence over the chemical name. And, if there are errors in the chemical structures of any chemical species described herein, the chemical structure of the chemical species that one of skill in the art understands the description to intend prevails.

Generally

Described herein are curing agents in compounds described herein. Also described herein are articles that have been cured and which, before curing, comprised such compounds. Also described herein are processes for curing the compounds described herein.

More specifically, the compounds described herein comprise:

A. a fluoroelastomer comprising copolymerized units of:
(1) one or more unsaturated fluorinated olefins;
(2) one or more unsaturated fluorinated olefin co-monomer different from 1) selected from the group consisting of fluorovinyl ethers, unsaturated fluorinated olefins, unsaturated olefins, and mixtures of these; and
(3) one or more cure site monomers selected from the group consisting of nitrile-containing fluorinated olefins and nitrile-containing fluorinated vinyl ethers;
and
B. 0.1 to 10 parts of at least one curing agent of formula (I):

$$R_1N=CR_2R_3 \quad (I)$$

wherein:
$R_1$ is H;
$R_2$ is selected from the group consisting of H, $NH_2$, and $NR_4R_5$;
$R_3$ is selected from the group consisting of Ph, $SO_2H$, $NR_6R_7$, 2-pyridine, and $CH_2CONH_2$;
$R_4$ is H;
$R_5$ is selected from the group consisting of Ph, $NH_2$, and CN;
$R_6$ is selected from the group consisting of H, NHPh, $CCONH_2$, $C_1$ to $C_8$ linear alkyl group, and $C_1$ to $C_8$ branched alkyl group; and
$R_7$ is selected from the group consisting of Ph, $COOC(CH_3)_3$, $NH_2$, $CH_2COOH$, $CSNH_2$, $CNHNH_3{}^+Cl^-$, p-phenylCN, COPh,

[structures: phenyl-triazole, methyl-pyrrole, and benzimidazole]

More specifically, articles described herein comprise a cured compound that, before curing, comprised:
A. a fluoroelastomer comprising copolymerized units of:
(1) one or more unsaturated fluorinated olefins,
(2) one or more unsaturated fluorinated olefin co-monomers different from 1) selected from the group consisting of fluorovinyl ethers, unsaturated fluorinated olefins, unsaturated olefins, and mixtures of these, and
(3) one or more cure site monomers selected from the group consisting of nitrile-containing fluorinated olefins and nitrile-containing fluorinated vinyl ethers; and
B. 0.1 to 10 parts of a curing agent of formula (I):

$$R_1N=CR_2R_3 \quad (I),$$

wherein:
$R_1$ is H;
$R_2$ is selected from the group consisting of H, $NH_2$, and $NR_4R_5$;
$R_3$ is selected from the group consisting of Ph, $SO_2H$, $NR_6R_7$, 2-pyridine, and $CH_2CONH_2$;
$R_4$ is H;
$R_5$ is selected from the group consisting of Ph, $NH_2$, and CN;
$R_6$ is selected from the group consisting of H, NHPh, $CCONH_2$, $C_1$ to $C_8$ linear alkyl group, and $C_1$ to $C_8$ branched alkyl group; and
$R_7$ is selected from the group consisting of Ph, $COOC(CH_3)_3$, $NH_2$, $CH_2COOH$, $CSNH_2$, $CNHNH_3{}^+Cl^-$, p-phenylCN, COPh,

[structures: phenyl-triazole, methyl-pyrrole, and benzimidazole]

The processes described herein comprising the step of curing compounds that comprise a fluoroelastomer A with at least one curing agent B of formula (I)

$$R_1N=CR_2R_3 \quad (I),$$

wherein:
the fluoroelastomer A comprises copolymerized units of:
(1) one or more unsaturated fluorinated olefins;
(2) one or more unsaturated fluorinated olefin co-monomers different from 1) selected from the group consisting of fluorovinyl ethers, unsaturated fluorinated olefins, unsaturated olefins, and mixtures of these; and
(3) one or more cure site monomers selected from the group consisting of nitrile-containing fluorinated olefins and nitrile-containing fluorinated vinyl ethers; and
$R_1$ is H;
$R_2$ is selected from the group consisting of H, $NH_2$, and $NR_4R_5$;
$R_3$ is selected from the group consisting of Ph, $SO_2H$, $NR_6R_7$, 2-pyridine, and $CH_2CONH_2$;
$R_4$ is H;
$R_5$ is selected from the group consisting of Ph, $NH_2$, and CN;
$R_6$ is selected from the group consisting of H, NHPh, $CCONH_2$, $C_1$ to $C_8$ linear alkyl group, and $C_1$ to $C_8$ branched alkyl group; and
$R_7$ is selected from the group consisting of Ph, $COOC(CH_3)_3$, $NH_2$, $CH_2COOH$, $CSNH_2$, $CNHNH_3{}^+Cl^-$, p-phenylCN, COPh,

[structures: phenyl-triazole, methyl-pyrrole, and benzimidazole]

Variations in compounds, articles, and processes for curing compounds described herein may expressly include or exclude any of the following elements or any combination of the following elements. That is, it is expressly contemplated that compounds, articles and processes described herein and recited in the claims may be varied to include or exclude the specific elements listed in this paragraph or any combination of these specific elements:

compounds may comprise a curing agent C that is different from curing agent B; and/or
the parts of curing agent C may range from 0.1 to 5 parts; and/or
the curing agent C may be selected from the group consisting of organotin curing agents, bis(aminophenol) curing agents, bis(aminothiophenol) curing agents, tetraamine curing agents, triamine curing agents, diamine curing agents, and mixtures of these curing agents; and/or the unsaturated fluorinated olefin A(1) may be selected from the group consisting of tetrafluoroethylene, hexafluoropropylene, 1,1-difluoroethylene; 1,1,2-trifluoroethylene; fluoroethylene, and mixtures of these; and/or the unsaturated fluorinated olefin co-monomer A(2) may be selected from the group consisting of perfluoro (methyl vinyl) ether, hexafluoropropylene, perfluoro (propyl vinyl) ether, and mixtures of these; and/or the curing agent B may be selected from the group consisting of amidinoamidine HCl, N', N"-diaminoamidine; phenyloxoaminoamidine, 3-(5-phenyl-4H-1, 2,4-triazolyl)amidine, 1H-pyrrolylamidine, benzimidazolylamidine, aminothioxoamidine; aminocarbonylmethylamidine HCl, N-aminoamidine bicarbonate, N"-1H-pyrazolyl-N'-t-butoxycarbonylamidine, 2-pyridylamidine HCl, sulfinoamidine, and mixtures of these; and/or these compounds may further comprise at least one filler; and/or the at least one filler may selected from the group comprising nonperfluoro-fluorine-containing elastomers, micropowders, carbon black, stabilizers, plasticizers, lubricants, processing aids, and mixtures of these.

The curing agents described herein exhibit the ability to cure the compounds described herein. One way of measuring the ability of a material to act as a curing agent is to measure the torque increase of these compounds over time as they are exposed to curing conditions. In particular, the compounds described herein exhibit a torque value (MH) that is at least 0.5 dNm, preferably to dNm, and more preferably 2 dNm greater than the initial torque value (ML) of these compounds before exposure to curing conditions.

The curing agents described herein are capable of increasing the torque value of these compounds exposed to curing conditions by at least 50 percent, preferably by at least 100 percent, and more preferably by at least 150 percent, over the initial torque value of an identical compound not exposed to curing conditions.

Compounds

A) Fluoroelastomers

Fluoroelastomers A described herein may be fluorinated or perfluorinated and comprise at least the following three copolymerized monomer units: A(1) about 25 to 74.9 mole percent of one or more unsaturated fluorinated olefins; A (2) about 25 to 74.9 mole percent of one or more unsaturated fluorinated olefin co-monomers different than unsaturated fluorinated olefin A(1) and are selected from the group consisting of fluorovinyl ethers, unsaturated fluorinated olefins, unsaturated olefins, and mixtures of there; and A(3) about 0.1 to 10 mole percent of one or more cure site monomers selected from the group consisting of nitrile-containing fluorinated olefins, nitrile-containing fluorinated vinyl ethers, or a mixture of these, wherein the mole percent of each of A (1), (2), and (3) is based on the total mole percent of A (1), (2), and (3) in fluoroelastomer A.

Fluoroelastomers A described herein may contain any of a variety of end groups as a result of the use of varying initiators or chain transfer agents during polymerization. Non-limiting examples of end groups include sulfonate, sulfonic acid, carboxylate, carboxylic acid, carboxamide, difluoromethyl groups, trifluorovinyl groups, or perfluorinated alkyl groups.

A (1) Unsaturated Fluorinated Olefins

Unsaturated fluorinated olefins A (1) include unsaturated monomers comprising at least one fluorine atom, preferably at least two fluorine atom, and most preferably perfluorinated monomers. Examples of unsaturated fluorinated olefins include tetrafluoroethylene (C2F4), hexafluoropropylene, 1,1-difluoroethylene; 1,1,2-trifluoroethylene; i-fluoroethylene, and combinations of these. The concentration of unsaturated fluorinated olefin A(1) may range from 25 and 74.9 mole percent of the total moles of monomer units in fluoroelastomer A.

A) (2) Unsaturated Fluorinated Olefin Co-Monomers

Unsaturated fluorinated olefin co-monomer A(2), which is different than unsaturated fluorinated olefin A (1) is selected from the group consisting of fluorovinyl ethers, unsaturated fluorinated olefins, unsaturated olefins, and mixtures of these.

Examples of fluorovinyl ethers used to prepare fluoroelastomer A include, perfluoro(alkyl vinyl) ethers (PAVE), perfluoro(alkoxy vinyl) ethers, fluoro(alkyl vinyl) ethers, fluoro (alkoxy vinyl) ethers, and mixtures of these. Suitable perfluorinated(alkyl vinyl) ethers which may be used to prepare the compounds described herein include those shown in formulas (II) to (VI):

$$CF_2=CFO(R_{f'}O)_n(R_{f''}O)_mR_f \qquad (II),$$

where $R_{f'}$ and $R_{f''}$ are different linear or branched perfluoroalkylene groups of 2-6 carbon atoms, m and n are independently 0-10, and $R_f$ is a perfluoroalkyl group of 1-6 carbon atoms.

Additional examples of perfluoro(alkyl vinyl) ethers includes compositions of formula (III):

$$CF_2=CFO(CF_2CFXO)_nR_f \qquad (III),$$

where X is F or $CF_3$, n is 0-5, and $R_f$ is a perfluoroalkyl group of 1-6 carbon atoms. Preferably, n iso or 1 and $R_f$ contains 1-3 carbon atoms. Examples of such perfluorinated (alkyl vinyl) ethers include perfluoro(methyl vinyl) ether and perfluoro(propyl vinyl) ether.

Other perfluoro(alkyl vinyl) ether monomers for the preparation of fluoroelastomer A include monomers of formulas (IV), (V), and (VI):

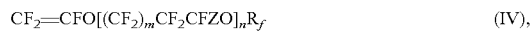

$$CF_2=CFO[(CF_2)_mCF_2CFZO]_nR_f \qquad (IV),$$

where $R_f$ is a perfluoroalkyl group having 1-6 carbon atoms, m=0 or 1, n=0-5, and Z=F or $CF_3$;

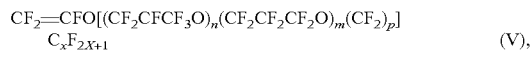

$$CF_2=CFO[(CF_2CFCF_3O)_n(CF_2CF_2CF_2O)_m(CF_2)_p]C_xF_{2X+1} \qquad (V),$$

where m and n=1-10, p=0-3, and x=1-5. Specific embodiments of this class include monomers where n=m=0-1, and x=1 and

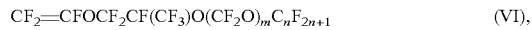

$$CF_2=CFOCF_2CF(CF_3)O(CF_2O)_mC_nF_{2n+1} \qquad (VI),$$

where n=1-5, m=1-3, and where, preferably, n=1.

Examples of perfluoro(alkyl vinyl) ethers include perfluoro methyl vinyl ether, perfluoropropyl vinyl ether, and perfluoroethyl vinyl ether. Examples of perfluoro(alkoxy vinyl) ethers include perfluoromethoxy vinyl ether, perfluoropropoxy vinyl ether, and perfluoroethoxy vinyl ether.

Examples of unsaturated fluorinated olefins include tetrafluoroethylene ($C_2F_4$); hexafluoropropylene; 1,1-difluoroethylene; 1,1,2-trifluoroethylene; 1-fluoroethylene; 1-fluoropropylene; 1,1-difluoropropylene; 1,1,3-trifluoropropylene; 1,1,3,3,3-pentafluoropropylene; and combinations of these. Examples of unsaturated olefins include ethylene, propylene, 1-butene, 2-butene, and combinations of these. Mixtures of fluorovinyl ethers, unsaturated fluorinated olefins, and unsaturated olefins may also be used.

The concentration of unsaturated fluorinated olefin co-monomer in fluoroelastomer A ranges from 25 to 74.9 mole percent, preferably from 30 to 65 mole percent, more preferably from 45 to 55 mole percent, based on the total mole percent of monomer units in fluoroelastomer A.

A (3) Cure Site Monomers

Fluoroelastomer A further comprises copolymerized units of one or more cure site monomers (3), generally in amounts of from 0.1 to 10 mole percent, preferably between 0.3 and 1.5 mole percent, based on the total mole percent of polymerizable monomer units used to prepare fluoroelastomer A. Although more than one type of cure site monomer may be present, cure site monomers comprise at least one nitrile substituent group are preferred. Suitable cure site monomers may include, but are not limited to, nitrile-containing fluorinated olefins and nitrile-containing fluorinated vinyl ethers. Useful nitrile-containing cure site monomers include those of formulae (VII)-(XI):

$$CF_2=CF-O(CF_2)_n-CN \qquad (VII),$$

where n=2-12, preferably 2-6;

$$CF_2=CF-O[CF_2-CFCF_3-O]_n-CF_2-CFCF_3-CN \qquad (VIII),$$

where n=0-4, preferably 0-2;

$$CF_2=CF-[OCF_2CFCF_3]_x-O-(CF_2)_n-CN \qquad (IX),$$

where x=1-2, and n=1-4; and $$CF_2=CF-O-(CF_2)_n-O-CF(CF_3)CN \qquad (X),$$

where n=2-4.

Preferably, monomers of formula (IX) are used as cure site monomers. Especially preferred cure site monomers include perfluorinated polyethers having a nitrile group and a trifluorovinyl ether group. A most preferred cure site monomer is perfluoro(8-cyano-5-methyl-3,6-dioxa-1-octene) (8-CNVE) and represented by formula (XI):

$$CF_2=CFOCF_2CF(CF_3)OCF_2CF_2CN \qquad (XI)$$

B) Curing Agents

Curing agents described herein may be represented by chemical entities of formula (I).

$$R_1N=CR_2R_3 \qquad (I),$$

wherein:
$R_1$ is H;
$R_2$ is selected from the group consisting of H, $NH_2$, and $NR_4R_5$;
$R_3$ is selected from the group consisting of Ph, $SO_2H$, $NR_6R_7$, 2-pyridine, and $CH_2CONH_2$;
$R_4$ is H;
$R_5$ is selected from the group consisting of Ph, $NH_2$, and CN;
$R_6$ is selected from the group consisting of H, NHPh, $CCONH_2$, $C_1$ to $C_8$ linear alkyl group, and $C_1$ to $C_8$ branched alkyl group; and $R_7$ is selected from the group consisting of Ph, $COOC(CH_3)_3$, $NH_2$, $CH_2COOH$, $CSNH_2$, $CNHNH_3^+$ $Cl^-$, p-phenylCN, COPh,

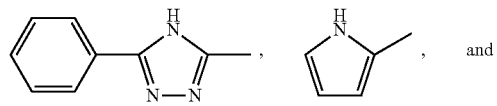 , 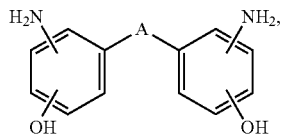 , and

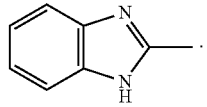

Non-limiting examples of curing agents of formula (I) include amidinoamidine (biguanide); N, N"-diaminoamidine; phenyloxoaminoamidine; 3-(5-phenyl-4H-1,2,4-triazolyl)amidine; 1H-pyrrolylamidine; benzimidazolylamidine; aminothioxoamidine; aminocarbonylmethylamidine; N-aminoamidine; N"-1H-pyrazolyl-N'-t-butoxycarbonylamidine; 2-pyridylamidine; and sulfinoamidine (formamidinesulphinic acid).

Curing agents of formula (I) disclosed herein may also be in the form of salts, tautomers, and/or associated with other counter ions. Examples of salts of the curing agents disclosed herein include, but are not limited to amidinoamidine HCl (biguanide HCl); aminocarbonylmethylamidine HCl (carboxamidomethylamidine HCl or malonamidamidine); N-aminoamidine bicarbonate (aminoguanidine bicarbonate); 2-pyridylamidine HCl; N-aminoamidine bicarbonate (aminoguanidine bicarbonate); sulfinoamidine (formamidinesulphinic acid); amidinoamidine HCl (biguanide HCl); and aminocarbonylmethylamidine HCl.

The concentration of curing agent B in these compounds ranges from 0.1 to 10 phr, preferably from 0.2 to 3 phr, and most preferably from 0.3 to 2 phr. An excess of curing agent B relative to the amount required to react with all the cure sites present in fluoroelastomer A may be used.

C) Curing Agents Different from Curing Agents B

Optional curing agent C differs from curing agent B. Examples of curing agent C include 8-CNVE, octadecylamine, hexadecylamine, and decylamine.

The use of optional curing agent(s) C as a co-curing agent along with curing agent B in these compounds creates what might be termed a "dual cure" curing system. The use of a dual cure curing system allows for the formation of at least two different types of crosslinks in these compounds, depending upon the nature of curing agent C). Dual cured compounds may exhibit physical property advantages from the use of two different types of curing agents, e.g., chemical resistance from one type of curing agent and heat resistance from the other curing agent.

Examples of the types of curing agents C that may be used in the compounds described herein include organotin curing agents or amino group-containing benzene curing agents. Nonlimiting examples of organotin curing agents include but are not limited to allyl-, propargyl-triphenyl- and allenyl tin curing agents. Specific examples of organotin curing agents include tetraalkyltin, tetraaryltin, and tetraphenyltin curing agents. The amount of curing agent C employed will necessarily depend on the degree of crosslinking desired in the final product as well as the type and concentration of reactive moieties in the compounds described herein.

Examples of amino group-containing benzene curing agents include bis(aminophenols) and bis(aminothiophenols) of formulas (XII) and (XIII)

XII

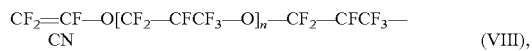

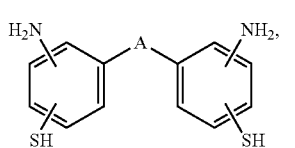

(XIII)

and tetraamines of formula (XIV)

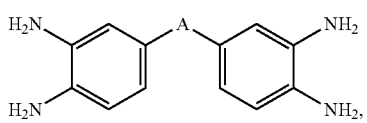

(XIV)

where A is $SO_2$, O, CO, alkyl of 1-6 carbon atoms, perfluoroalkyl of carbon atoms, or a carbon-carbon bond linking the two aromatic rings. The amino and hydroxyl groups in formulas XII and XIII above, are interchangeable in the meta and para positions with respect to the group A. Specific examples of bis(aminophenol) and bis(aminothiophenol) curing agents include 2,2-bis[3-amino-4-hydroxyphenyl] hexafluoropropane (diaminobisphenol AF); 4,4'-sulfonylbis (2-aminophenol); 3,3'-diaminobenzidine; and 3,3',4,4'-tetraaminobenzophenone, with 3,3'-diaminobenzidine being preferred.

The concentration of curing agent C, when present, in these compounds ranges from 0.5 to 5.0 phr, preferably 1.0 to 2.5 phr.

When optional curing agent C is present, the total amount of curing agent B and curing agent C may be in molar excess relative to the molar amount required to react with all the cure sites present in the compounds described herein. Particularly suitable compounds described herein include:

A. a fluoroelastomer comprising copolymerized units of
(1) tetrafluoroethylene,
(2) perfluoro(methyl vinyl) ether, and
(3) perfluoro(8-cyano-5-methyl-3,6-dioxa-1-octene);

B. one or more curing agents selected from the group consisting of amidinoamidine HCl (biguanide HCl); N, N''-diaminoamidine; phenyloxoaminoamidine; 3-(5-phenyl-4H-1,2,4-triazolyl)amidine; 1H-pyrrolylamidine; benzimidazolylamidine; aminothioxoamidine; aminocarbonylmethylamidine HCl; N-aminoamidine bicarbonate; N'''-1H-pyrazolyl-N'-t-butoxycarbonylamidine; 2-pyridylamidine HCl; and sulfinoamidine (formamidinesulphinic acid); and C. one or more curing agents selected from the group consisting of organotin, is(aminophenol), bis(aminothiophenol), and tetraamine curing agents.

Additives

The compounds described herein may additionally comprise a non-perfluoro-containing elastomer capable of independently cross-linking with any fluoroelastomer A cure sites. Examples of the non-perfluoro-containing elastomer are those having, at least at either its main chain or an end of its side chain, at least one kind of crosslinkable group selected from the group consisting of: cyano (—CN), carboxyl (—COOH), alkoxycarbonyl (—COOR$_9$, where R$_9$ is a monovalent organic group), and an acid halide group (—COX$_1$, where X$_1$ is a halogen atom) capable of a cross-linking reaction with fluoroelastomer A.

Examples of non-perfluoro-containing elastomers include, but are not limited to, a fluorine-containing, but not a perfluoro-containing, rubber; a thermoplastic fluorine-containing rubber; and a rubber composition comprising a fluorine-containing rubber.

The fluorine-containing rubber may contain a monomer unit independently selected from the group consisting of vinylidene fluoride (VDF), tetrafluoroethylene, and hexafluoropropylene, and at least one additional monomer such as tetrafluoroethylene, hexafluoropropylene, perfluoro (alkyl vinyl ether), chlorotrifluoroethylene, trifluoroethylene, trifluoropropylene, pentafluoropropylene, trifluorobutene, tetrafluoroisobutene, vinyl fluoride, and iodine-containing fluorinated vinyl ethers, ethylene, propylene, alkyl vinyl ether, and combinations of these.

Additives such as carbon black, stabilizers, plasticizers, lubricants, fillers, and processing aids typically utilized in compounding can be incorporated into the compounds described herein, provided they have adequate stability for the intended service conditions. In particular, low temperature performance can be enhanced by incorporation of perfluoropolyethers.

Carbon black fillers may be used in elastomers as a means to balance modulus, tensile strength, elongation, hardness, abrasion resistance, conductivity, and processability of these compounds. In these compounds, small particle size, high surface area carbon blacks are preferred. A grade of carbon black commonly chosen is SAF carbon black, a highly reinforcing black with an average particle size of about 14 nm and designated N 110 in Group No. 1, according to ASTM D 1765. A particular class of carbon blacks useful in these compounds are those described in U.S. Pat. No. 5,554,680. These carbon blacks have average particle sizes of at least about 100 nm to about 500 nm as determined by ASTM $D_3 8_{49}$. Examples include MT blacks (medium thermal black) designated N-991, N-990, N-908, and N-907, and large particle size furnace blacks. MT blacks are preferred. When carbon black is added, the particle size ranges from 1 to 70 phr, preferably from about 0.01 to about 50 phr, more preferably from 1 to 50 phr, and most preferably from 10 to 50 phr.

In addition to, or in combination with carbon black fillers, non-carbon black fillers may be present in the compounds described herein. An example of a non-carbon black filler that may be used includes anhydrous silica such as acidic silica or fumed silica. Such silicas are available from Degussa Aktiengesellschaft (Frankfurt, Germany) under the Aerosil® trademark. A particularly useful type is Aerosil® 200 silica. Other suitable silicas include Reolosil® silicas, available from Tokuyama KK (Tokyo, Japan), for example Reolosil® 0513, Reolosil® 05102, and Reolosil® QS$_{30}$. Silica amounts range from 1 to 25 phr, but preferably no more than 1 to 7 phr.

Additional types of fillers include micropowders or fluoroadditives. Micropowders are ordinarily partially crystalline polymers. Micropowders include finely divided, easily dispersed plastic fluoropolymers that are solid at the highest temperature utilized in fabrication and curing of the compounds described herein. The term "solid" refers to a plastic fluoropolymer that has a crystalline melting temperature above the processing temperature(s) of the compounds described herein.

Micropowders that can be used in these compounds include, but are not limited to, micropowders based on the group of polymers known as tetrafluoroethylene (TFE) polymers. This group includes polytetrafluoroethylene (PTFE) and copolymers of TFE with small concentrations of about 1 mole percent or less of at least one copolymerizable modifying monomer such that the micropowders do not melt or soften during processing of fluoroelastomer A that comprise the micropowders. The modifying monomer may be, for example, hexafluoropropylene (HFP), perfluoro(propyl vinyl) ether (PPVE), perfluorobutyl ethylene, chlorotrifluoroethylene, or another monomer that introduces side groups into the polymer molecule.

Tetrafluoroethylene polymers used as additives in these compounds include copolymers of TFE having sufficient concentrations of copolymerized units of one or more monomers to reduce the melting point below that of PTFE. Such copolymers generally have melt viscosity in the range of $0.5$-$60 \times 10^3$ Pa·s, but viscosities outside this range are also known. Perfluoroolefins and perfluoro(alkyl vinyl) ethers are preferred comonomers. Hexafluoropropylene and perfluoro(propyl vinyl) ether are most preferred. Examples of TFE copolymers include TFE/hexafluoropropylene copolymer and TFE/perfluoro(propyl vinyl)ether copolymers, provided they satisfy constraints on melting temperature with respect to perfluoroelastomer processing temperature. These copolymers can be utilized in powder form as isolated from the polymerization medium, if particle size is acceptable, or they can be ground to suitable particle size starting with stock of larger dimensions.

The amount of non-carbon black fill in these compounds ranges from about 0.01 to 33 phr and preferably at least about 1 to 5 phr.

Preparing Compounds Described Herein and Curing Articles Described Herein that Comprised these Compounds The compounds described herein may be prepared by mixing until homogeneous fluoroelastomer A, curing agent(s) B, and optional components using rubber compounding procedures such as a two roll rubber mill, an internal mixer, for example, a Banbury internal mixer, or in an extruder. These compounds may be cured by the application of heat and/or of pressure sufficient to cause curing agent B to form crosslinks with cure site monomer(s) or a dual cure system may also be used. When compression molding is used to cure, a press cure cycle is preferably followed by a post cure cycle during which the press cured compound is heated at elevated temperatures in excess of 300° C. for several hours.

When cured, the compounds described herein become articles described herein and exhibit suitable thermal stability and chemical resistance for the applications in which these articles are used. These articles are useful: as seals and gaskets for high temperature contexts, in a wide range of chemical environments, in seals for high temperature automotive uses, and O-rings.

EXAMPLES

The exemplary compounds identified by "E" in the tables below are intended only to further illuminate and not to limit the scope of compounds, processes, and articles described and recited herein. Comparative examples are identified in the tables below by "C".

Materials
  Fluoroelastomer A: comprises 48.8 wt. % units of TFE, 49.0 wt. % units of perfluoro(methyl vinyl) ether (PMVE) and 2.2 wt. % units of 8-CNVE. Fluoroelastomer A can be prepared by the process disclosed in U.S. Pat. No. 5,789,489, col. 10 to 11.
  Perfluoro(methyl vinyl) ether: available from E.I. DuPont de Nemours and Company, Wilmington, Del. ["DuPont"].
  8-CNVE: perfluoro(8-cyano-5-methyl-3,6-dioxa-1-octene), available from DuPont.
  CA-1: Aminoguanidine bicarbonate available from Alfa Aesar®, Ward Hill, Mass., USA
  CA-2: N-amidinothiourea available from Alfa Aesar®, Ward Hill, Mass., USA
  CA-3: Malonamidamidine hydrochloride available from Alfa Aesar®, Ward Hill, Mass., USA
  CA-4: biguanide hydrochloride available from Waterstone Technology/Brookview Scientific, LLC Carmel, Ind., USA
  CA-A: o-tolylbiguanide available from Sigma Aldrich, St. Louis, Mo., USA.
  Armeenl8D: octadecylamine, available from Akzo Nobel, Amersfoort, The Netherlands.
  Carbon Black: Thermax® Nggo medium thermal carbon black having an average particle size of 280 nm available from Cancarb Limited, Alberta, Canada.
  Proton Sponge®: 1,8-Bis(dimethylamino)naphthalene, N,N,N',N'-Tetramethyl-1,8-naphthalenediamine, available from Sigma Aldrich, St. Louis, Mo., USA.

Test Methods
Cure Characteristics
Cure characteristics were measured using a Monsanto MDR 2000 instrument under the following conditions:
Moving die frequency: 1.66 Hz
Oscillation amplitude: ±0.5 degrees
Temperature: 199 deg. C., unless otherwise noted
Sample size: Disks having diameter of 1.5 inches (38 mm)
Duration of test: 30 minutes for examples of the invention, 20 minutes for comparative examples.

The following cure parameters were recorded:
MH: torque value at end of test period, in units of dNm
ML: initial torque value, in units of dNm The compounds described herein used for torque testing were prepared from ingredients disclosed in Table 1. Compounding was carried out on a rubber mill. The milled compounds were formed into sheets and 10 g samples were die cut into disks to form the test specimens.

Cure characteristics were determined by placing a test specimen in the test cavity of the instrument which was maintained under a positive pressure and a test temperature of 199° C. As soon as the test specimen was placed in the test cavity, a biconical disk was embedded in the test specimen and the disk oscillated through an arc of 0.5° at the specified frequency, thereby exerting a shear strain on the test specimen. The torque value was measured on the test specimen as soon as the biconical disk was placed into the test cavity. This torque value is ML (initial torque value). The test specimen was maintained at 199° C. during testing and torque values recorded as a function of time. The test is completed after 30 minutes for examples of the invention, 20 minutes for comparative examples. The torque values of the test specimen after the designated time were recorded as MH (final torque value).

The force at maximum amplitude (torque) required to rotate the disk is proportional to the stiffness (shear modulus) of the rubber. This torque was recorded as a function of time. Because stiffness of a rubber specimen increases during curing, the test provides a measure of curability.

The increase in torque value that results from the curing of these compounds is calculated as the difference between the initial torque value (ML) and the final torque value (MH) at the completion of the test.

One way to calculate the effectiveness of a material to act as a curing agent for these compounds is to measure the increase in torque during exposure of these compounds to curing conditions. The use of a curing agent of formula (I) to cure the compounds described herein results in compounds which exhibits at least a 0.5 dNm increase, preferably at least a to dNm increase, and more preferably at least a 2.0 dNm increase, and most preferably at least a 3.0 dNm increase in torque compared to the initial torque value of an identical compound which has not been exposed to curing conditions. An increase in torque of less than 0.5 dNm is an indication of a material that does not impart a significant number of crosslinks to these compounds to provide an article having desirable physical properties.

Another way to calculate how effective material is as a curing agent for these compounds is to examine the percent improvement in torque values between the ML and MH values using a Monsanto MDR 2000 instrument or similar equipment that can measure torque increase over time. The percent improvement in torque values is represented by the formula:

$(MH-ML)/ML \times 100$ = percent increase in torque.

The curing agents of formula (I) can be used to cure the compounds described herein to prepare articles such as O-rings and seals. The use of a curing agent of formula (I) to cure these compounds results in compounds which, when exposed to curing conditions, exhibit at least a 100 percent increase in torque, preferably at least a 150 percent increase in torque, and most preferably at least a 200 percent increase in torque compared to the initial torque value of the identical compound which has not been exposed to curing conditions. An increase in torque of less than 50 percent is an indication of a curing material that does not impart a significant number of crosslinks to these compounds to provide an article having desirable physical properties.

The materials shown in Table 1 were used to prepare Examples $E_1$ to $E_3$ by compounding the ingredients on a two-roll rubber mill. Cure characteristics of these are also shown in Table 1.

Comparative Examples (C) comprising amine curing agents which are chemically different than the amine curing agents disclosed herein were made and tested in the same manner as were Examples E1 to E3.

TABLE 1

| Components (phr*) | Ex 1 | Ex 2 | Ex 3 | C1 | C2 |
|---|---|---|---|---|---|
| Fluoro-elastomer A | 100 | 100 | 100 | 100 | 100 |
| Carbon Black | 30 | 30 | 30 | 15 | 15 |
| CA-1 | 0.4 | | | | |
| CA-2 | | 0.36 | | | |
| CA-3 | | | 0.42 | | |
| Armeen18D | | | | 1 | 0 |
| Proton Sponge ® | | | | 0 | 1 |
| Cure Characteristics | | | | | |
| ML (dNm) | 3.45 | 1.96 | 1.44 | 2.44 | 1.64 |
| MH (dNm) | 10.1 | 14.54 | 9.55 | 2.68 | 2.05 |
| MH − ML (dNm) | 6.65 | 12.58 | 8.3.3. | 0.24 | 0.41 |
| Torque Increase (%) | 192 | 641 | 563 | 9.8 | 25 |

As can be seen from the data in Table 1, C1 and C2 exhibited an insignificant rise in torque (MH to ML) when exposed to curing conditions of less than 0.5 dNm or a maximum percent improvement of only 25 percent. Conversely, the curing agents used in E1 to E3 exhibited a significant increase in torque with the minimum increase in torque being 6.65 dNm compared to a maximum torque increase of the comparative examples of only 0.41 dNm. The minimum percent increase in torque of E1 to E3, when curing agents B were used was 192 percent with a maximum increase in torque of 641 percent. The increase in torque in the examples during testing is an excellent indicator that significant curing is occurring compared to the curing agents used in the comparative examples.

TABLE 2

| Components (phr*) | E4 | C3 |
|---|---|---|
| Fluoro-elastomer A | 100 | 100 |
| Carbon Black | 30 | 30 |
| CA-4 | 1.5 | |
| CA-A | | 2.1 |
| Cure Characteristics | | |
| ML (dNm) | 0.20 | 1.95 |
| MH (dNm) | 16.40 | 1.96 |
| MH − ML (dNm) | 16.20 | 0.01 |
| Torque Increase (%) | 8loo | 0.5 |

$E_4$ is a salt of curing agent B described herein, which exhibits desirable curing characteristics. $C_3$ uses an amine curing agent which does not cure the compounds described herein. $C_3$ shows that substituents $R_2$ and $R_3$ of formula (I) can have a direct influence on whether or not the curing agent will cure or crosslink these compounds to achieve an increase in torque of at least 0.5 dNm.

What is claimed is:

1. A compound comprising:
   A. a fluoroelastomer comprising copolymerized units of:
      (1) one or more unsaturated fluorinated olefins;
      (2) one or more unsaturated fluorinated olefin co-monomer different from 1) selected from the group consisting of fluorovinyl ethers, unsaturated fluorinated olefins, unsaturated olefins, and mixtures of these; and
      (3) one or more cure site monomers selected from the group consisting of nitrile-containing fluorinated olefins and nitrile-containing fluorinated vinyl ethers; and
   B. 0.1 to 10 mole percent of at least one curing agent of formula (I):

$R_1N = CR_2R_3$     (I)

wherein:
   $R_1$ is H;
   $R_2$ is selected from the group consisting of, $NH_2$, and $NR_4R_5$;
   $R_3$ is selected from the group consisting of, $SO_2H$, $NR_6R_7$, 2-pyridine, and $CH_2CONH_2$;
   $R_4$ is H;
   $R_5$ is selected from the group consisting of, $NH_2$, and CN;
   $R_6$ is selected from the group consisting of H, $CCONH_2$, and
   $R_7$ is selected from the group consisting of, $COOC(CH_3)_3$, $NH_2$, $CH_2COOH$, $CSNH_2$,

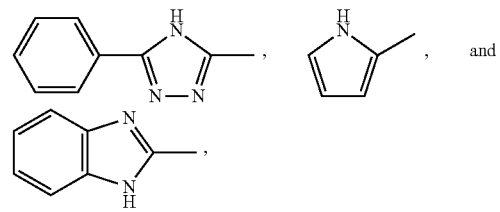

$CNHNH_3^+Cl^-$, p-phenylCN, COPh,
provided that when $R_7$ is $CSNH_2$, $R_2$ is not $NH_2$.

2. The compound of claim 1, further comprising 0.1 to 5 phr of a curing agent C different from curing agent B.

3. The compound of claim 1, wherein the unsaturated fluorinated olefin (a)(1) is selected from the group consisting of tetrafluoroethylene, hexafluoropropylene, 1,1-difluoroethylene; 1,1,2-trifluoroethylene; 1-fluoroethylene, and mixtures of these.

4. The compound of claim 2, wherein the unsaturated fluorinated olefin (a)(1) is selected from the group consisting of tetrafluoroethylene, hexafluoropropylene, 1,1-difluoroethylene; 1,1,2-trifluoroethylene; 1-fluoroethylene, and mixtures of these.

5. The compound of claim 3, wherein the unsaturated fluorinated olefin co-monomer (a)(2) is selected from the group consisting of perfluoro(methyl vinyl) ether, hexafluoropropylene, perfluoro(propyl vinyl) ether, and mixtures of these.

6. The compound of claim 4, wherein the unsaturated fluorinated olefin co-monomer (a)(2) is selected from the group consisting of perfluoro(methyl vinyl) ether, hexafluoropropylene, perfluoro(propyl vinyl) ether, and mixtures of these.

7. The compound of claim 1, wherein the curing agent B is selected from the group consisting of amidinoamidine HCl, phenyloxoaminoamidine, 3-(5-phenyl-4H-1,2,4-triazolyl)amidine, 1H-pyrrolylamidine, benzimidazolylamidine, aminothioxoamidine; aminocarbonylmethylamidine HCl, N-aminoamidine bicarbonate, N"-1H-pyrazolyl-N'-t-butoxycarbonylamidine, 2-pyridylamidine HCl, sulfinoamidine, and mixtures of these.

8. The compound of claim 5, wherein the curing agent B is selected from the group consisting of amidinoamidine HCl, phenyloxoaminoamidine, 3-(5-phenyl-4H-1,2,4-triazolyl)amidine, 1H-pyrrolylamidine, benzimidazolylamidine, aminothioxoamidine; aminocarbonylmethylamidine HCl, N-aminoamidine bicarbonate, N"-1H-pyrazolyl-N'-t-butoxycarbonylamidine, 2-pyridylamidine HCl, sulfinoamidine, and mixtures of these.

9. The compound of claim 8, further comprising at least one filler selected from the group comprising nonperfluorofluorine-containing elastomers, micropowders, carbon black, stabilizers, plasticizers, lubricants, processing aids, and mixtures of these.

10. The compound of claim 2, wherein the curing agent C is selected from the group consisting of organotin curing agents, bis(aminophenol) curing agents, bis(aminothiophenol) curing agents, tetraamine curing agents, triamine curing agents, diamine curing agents, and mixtures of these.

11. The compound of claim 2, wherein the curing agent B is selected from the group consisting of amidinoamidine HCl, phenyloxoaminoamidine, 3-(5-phenyl-4H-1,2,4-triazolyl)amidine, 1H-pyrrolylamidine, benzimidazolylamidine, aminothioxoamidine; aminocarbonylmethylamidine HCl, N-aminoamidine bicarbonate, N"-1H-pyrazolyl-N'-t-butoxycarbonylamidine, 2-pyridylamidine HCl, sulfinoamidine, and mixtures of these.

12. The compound of claim 10, wherein the curing agent B is selected from the group consisting of amidinoamidine HCl, phenyloxoaminoamidine, 3-(5-phenyl-4H-1,2,4-triazolyl)amidine, 1H-pyrrolylamidine, benzimidazolylamidine, aminothioxoamidine; aminocarbonylmethylamidine HCl, N-aminoamidine bicarbonate, N"-1H-pyrazolyl-N'-t-butoxycarbonylamidine, 2-pyridylamidine HCl, sulfinoamidine, and mixtures of these.

13. The compound of claim 6, wherein the curing agent B is selected from the group consisting of amidinoamidine HCl, phenyloxoaminoamidine, 3-(5-phenyl-4H-1,2,4-triazolyl)amidine, 1H-pyrrolylamidine, benzimidazolylamidine, aminothioxoamidine; aminocarbonylmethylamidine HCl, N-aminoamidine bicarbonate, N"-1H-pyrazolyl-N'-t-butoxycarbonylamidine, 2-pyridylamidine HCl, sulfinoamidine, and mixtures of these.

14. The compound of claim 13, further comprising at least one filler selected from the group comprising nonperfluorofluorine-containing elastomers, micropowders, carbon black, stabilizers, plasticizers, lubricants, processing aids, and mixtures of these.

* * * * *